Patented July 18, 1950

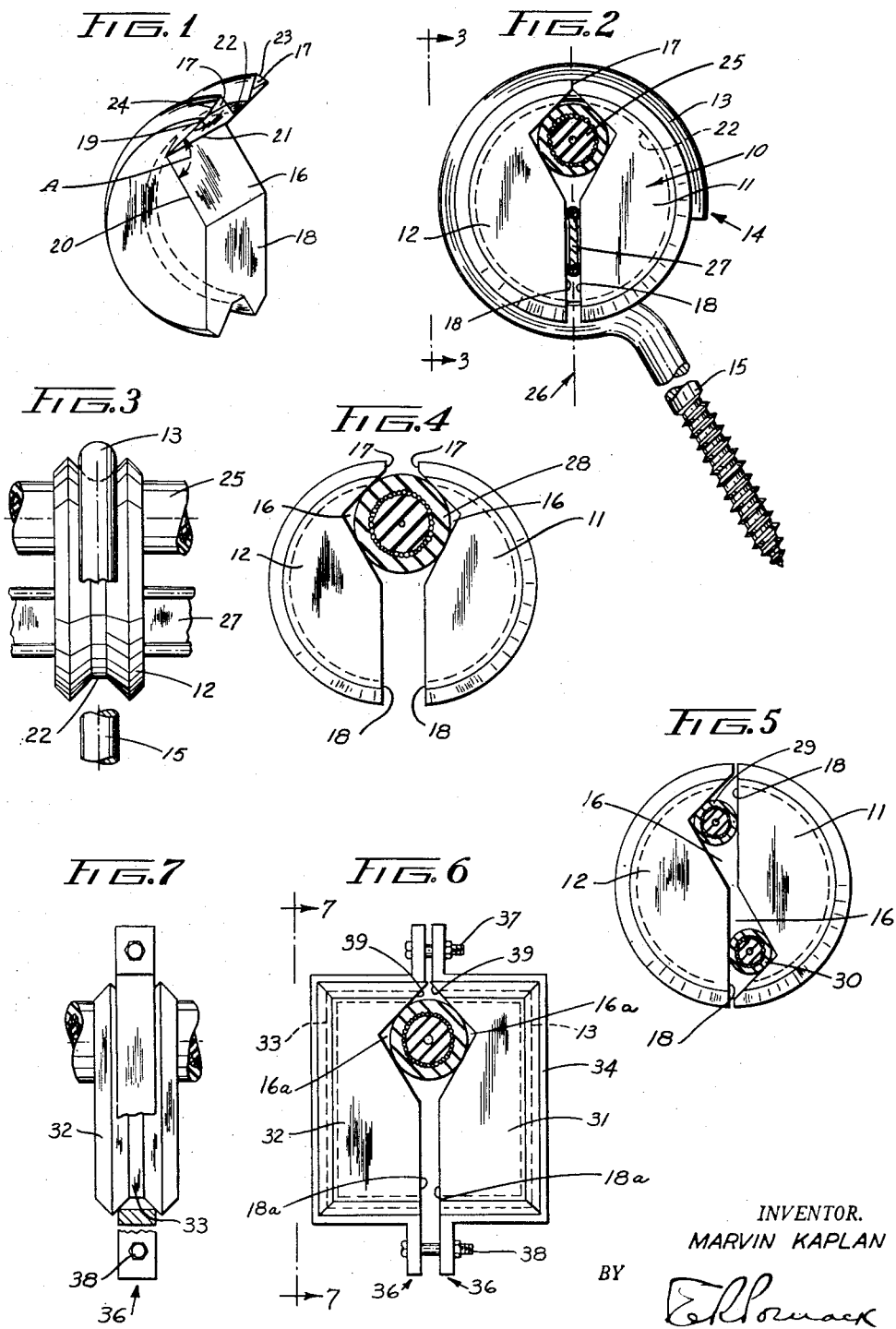

2,515,603

UNITED STATES PATENT OFFICE 2,515,603

TWO-PART CABLE-CLAMPING INSULATOR AND HOLDER

Marvin Kaplan, Bronx, N. Y.

Application May 21, 1948, Serial No. 28,458

5 Claims. (Cl. 174—155)

This invention relates to insulated cable-clamping grommets—more particularly, although not exclusively, of the type adapted for use with cable stand-offs or other cable supports employed in television, radio and other analogous installations.

With the advent and development of television, there has arisen a great demand for cable stand-off devices, particularly since the cables must be kept spaced from the building wall. Among the commercial types of stand-offs commonly employed are the spacing bracket with an aperture through which the cable is adapted to pass, and the threaded eye-bolt type the ring of which holds a partially split insulating grommet of resilient material. Devices of the first mentioned type have the disadvantage of affording no clamping means upon the cable; and devices of the second mentioned type have the disadvantage of being limited to materials of resilient properties in order to obtain a clamping hold upon the cable. And in both of these categories, the stand-offs are not adapted operatively to accommodate more than one cable in mutual fixed, spaced relation. Furthermore, the partially split resilient grommet of the said second type is adapted only for operatively holding a cable of one predetermined size, so that installation men must carry with them a large number of conventional grommets of various types and sizes.

It is primarily within the contemplation of my invention to provide an insulated cable clamping grommet having none of the aforesaid disadvantages of conventional cable holders. More specifically, it is an important object of my invention to provide an insulating grommet of such flexibility in use that it will be adapted for all types of installations in which insulated stand-offs are required, and capable of operatively clamping any type of cable for television, radio, telephone and micro-wave use. And in this aspect of my invention it is a further object to provide a cable clamping grommet adapted operatively to hold any of the various commercial sizes of either the ribbon or twin lead cable, or of the round coaxial type of cable.

It is becoming increasingly important that television installations be adapted for use with two antennas—one for high frequency and the other for low frequency channels. It is accordingly a further object of my invention to provide a cable clamping grommet that will conveniently hold two cables in spaced parallel and insulated relation.

Still another object of my invention is to provide simple and readily fabricated cable clamping grommets adapted for adjustable use with threaded eye-bolt stand-offs of different ring sizes, and capable of ready adjustment by a simple manipulation for accommodating cables of various types and sizes.

Other objects, features and advantages will appear from the drawings and the description hereinafter given.

Referring to the drawings:

Figure 1 is a perspective view of the basic element of a preferred form of my invention—one of two identical complementary coacting clamping grommet sections.

Figure 2 is a front elevation of a set of grommet sections according to Fig. 1 shown operatively assembled within the ring of an eye-bolt stand-off, and operatively clamping therebetween one coaxial and one ribbon type of cable, the cables being shown in section.

Figure 3 is a side view of Fig. 2, part of the eye-bolt being removed for clarity.

Figure 4 is a front elevation of two coacting grommet sections like that of the preceding figures, shown separated sufficiently to accommodate a relatively large coaxial cable, the eye-bolt stand-off being removed for clarity.

Figure 5 is a view substantially like Fig. 4, but showing the two grommet sections in reversed position, and operatively holding therebetween two relatively smaller coaxial cables.

Figure 6 is a front elevation of a somewhat modified form of my invention, showing two substantially rectangular grommet sections in the position indicated in Fig. 4, and maintained in relative operative position by two adjustably separable frames, and Figure 7 is a side view of Fig. 6.

In the form of my invention illustrated in Figs. 1 to 5, the grommet 10 consists of two identical sections 11 and 12, held together in their selected operative positions by the ring portions 13 of the eye-bolt 14 of which the threaded shank 15 is an integral part, the said ring portions being in holding engagement with the outer peripheral portions of the grommet sections.

The inner peripheral portions of the grommet sections are in facing relation, each inner peripheral portion containing a recessed or notched portion 16 flanked by inner surfaces 17 and 18, the notch 16 being diametrically off-center whereby the longitudinal (substantially diametrical) extent of portion 18 is considerably greater than that of portions 17. In the preferred form illustrated, the angle A between sides 19 and 20 of the notched portion 16 is obtuse, side 19 which is adjacent portions 17 being shorter than side 20 which is adjacent portion 18. Furthermore, surfaces 17 and 18 are preferably parallel to each other, the plane of surface 18 being closer to juncture 21 of sides 19 and 20 than the plane of surfaces 17.

The outer periphery of each grommet section contains a peripheral groove 22, the lateral peripheral edges 23 and 24 being bevelled downwardly and outwardly, for convenience in assemblying and handling. In the assembled position of the parts of this device (see Fig. 2) the ring portion 13 of the eye-bolt 14 is in embracing engagement with the peripheral grooved portions 22 on the two complementary grommet sections 11 and 12. In the form shown, the shank 15 is adapted for threaded engagement with the wall of a building, so that the cables operatively held by the insulating grommet sections 11 and 12 are spaced from the wall.

In Fig. 2 the notches 16 of the two grommet sections are placed in adjacent, oppositely disposed, coacting relation, so that the walls of said notches will hold therebetween a coaxial cable, such as the cable 25 illustrated. Since the opposite coacting clamping walls 18 are set back from the center line 26, as illustrated, a space will be provided between said walls to accommodate therebetween the flat twin-lead cable 27. In the embodiment shown in Fig. 2, the portions 17 are in abutting relation, each being diametrically positioned with respect to the arcuate peripheries of their respective grommet sections.

Figure 4 shows how the two complementary grommet sections 11 and 12 are separated farther apart than in the position shown in Fig. 2, thereby enabling the notched portions 16 operatively to accommodate therebetween a coaxial cable 28 of considerably greater diameter than cable 25.

Figure 5 shows the same two grommet sections 11 and 12 in another relative position, grommet section 11 having been reversed so that the notched portion 16 thereof is diametrically opposite the corresponding notch of section 12. In this position, the notch walls of section 12 are in coactive relation with elongated wall 18 to accommodate therebetween the coaxial cable 29; and the notch walls of section 11 are in coactive relation with elongated wall 18 of section 12 to clamp therebetween the coaxial cable 30. It is apparent that the coacting cable clamping walls in the arrangement shown in Fig. 5 are in closer cooperative relation than they are in the positions of either Figs. 2 or 4, whereby relatively small coaxial cables 29 and 30 may be clamped by the arrangement of Fig. 5.

As is apparent from the description hereinabove given, either ribbon type or coaxial cables may be firmly clamped, either singly or in pairs, by the device of my invention. Adjustment as to size can also obviously be made, since the grommet 10, being split and separable, can have its operative parts either separated or brought together to accommodate various thicknesses and diameters of cables. The only adjusting that would have to be made, other than the separation or the reversal of the grommet sections, would be with respect to the coacting eye-bolt stand-off. Since the grommet sections are provided with peripheral grooves 22 adapted to accommodate the ring portion of an eye-bolt, all that need be done, after the cable or cables are operatively placed between the sections, is to crimp the ring of a sufficiently large eye-bolt about the peripheries of the two coacting sections 11 and 12, until said ring comes into firm engagement with the groove portions 22, thereby firmly holding the cables in place.

In the form of my invention illustrated in Figs. 6 and 7, the grommet sections 31 and 32 are substantially rectangular in contour, except for the notched portions 16a. The sections contain peripheral grooves 33 which accommodate the frames 34 and 35 of the separable stand-off or holding member 36, maintained in selected spaced relation by the bolt and nut assemblies 37 and 38. The said notched portions 16a and inner coacting walls 18a of the sections 31 and 32 are substantially like the corresponding walls shown in Fig. 1. However, it will be noted that instead of a flat portion 17 each of the sections contains a peripheral edge 39.

In the form of my invention shown in Figs. 6 and 7, the sections 31 and 32 can be reversed precisely in the manner shown in Fig. 5; and the said sections 31 and 32 can be operatively separated, merely by operatively manipulating the bolt and nut assemblies 37 and 38.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

I claim:

1. A cable-clamping device of the class described comprising two separable coacting grommet sections and a supporting member adapted for embracing engagement therewith along outer peripheral portions thereof, said sections having inner peripheral portions in facing relation, each of said inner peripheral portions having a notched portion and at least one substantially flat wall, said grommet sections being adapted for placement within said supporting member in two positions, one of said positions being with the said notched portions in adjacent facing relation for accommodating therebetween a coaxial type cable, and with said flat walls in adjacent facing relation for accommodating therebetween a ribbon type cable, the other of said positions being with each of said notched portions facing the flat wall of the other grommet section, for accommodating therebetween two coaxial type cables, said grommet sections being of electrical insulating material, the said notched portions each being substantially V-shaped and off-center with respect to the longitudinal extent of the corresponding inner peripheral portion, the terminals opposite the said flat walls of the inner peripheral portions being abuttable, said flat walls being in spaced parallel relation when said terminals are in abutment.

2. A cable-clamping device according to claim 1, the apical portion of each V-shaped notch forming an obtuse angle, the inner peripheral portions being further provided with short flat walls adjacent the notched portions and opposite and parallel to the first mentioned walls, the planes of the said short flat walls being farther removed than the oppositely disposed flat walls from the V-notch apex of the corresponding grommet sections.

3. A cable-clamping device according to claim 2, the two grommet sections being identical in construction.

4. An insulating cable-clamping grommet comprising two separable sections, each section having an outer peripheral portion and an inner peripheral portion, said inner peripheral portions being in facing relation and each having an off-center notch flanked by one short and one relatively long wall, the short walls of the two sections being abuttable, the long walls being in spaced relation and the notches in adjacent facing relation when the said short walls are in abutment.

5. A cable-clamping device according to claim 4, said sections being identically proportioned and shaped, the outer peripheral portions of the two sections being grooved.

MARVIN KAPLAN.

REFERENCES CITED

The following references are of record in the file of this patent:

UNITED STATES PATENTS

| Number | Name | Date |
|---|---|---|
| 368,284 | Fletcher | Aug. 16, 1887 |
| 419,642 | Cornog | Jan. 21, 1890 |
| 756,627 | Hanson | Apr. 5, 1904 |
| 793,313 | Moss | June 27, 1905 |
| 947,094 | Burton | Jan. 18, 1910 |
| 1,751,827 | Marshall | Mar. 25, 1930 |
| 1,898,614 | Brady | Feb. 21, 1933 |
| 2,350,290 | Moore | May 30, 1944 |

FOREIGN PATENTS

| Number | Country | Date |
|---|---|---|
| 80,718 | Germany | Apr. 18, 1895 |